United States Patent [19]

Hammer et al.

[11] Patent Number: 5,928,737
[45] Date of Patent: Jul. 27, 1999

[54] SAUSAGE CASINGS MADE OF THERMOPLASTIC STARCH AND PROCESS FOR THE PRODUCTION THEREOF

[75] Inventors: Klaus-Dieter Hammer, Mainz; Gerhard Grolig, Moerfelden-Walldorf; Dieter Beissel, Wiesbaden, all of Germany

[73] Assignee: Hoechst Aktiengesellschaft, Frankfurt, Germany

[21] Appl. No.: 08/548,868

[22] Filed: Oct. 26, 1995

[30] Foreign Application Priority Data

Oct. 31, 1994 [DE] Germany ............... 44 38 961

[51] Int. Cl.⁶ ............... A22C 13/00; A22C 11/00
[52] U.S. Cl. ............... 428/34.8; 428/35.6; 428/36.9; 428/910; 426/105; 426/129; 426/138; 138/118.1; 452/30; 452/35
[58] Field of Search .................. 428/34.8, 36.9, 428/36.91, 910, 35.6; 426/105, 129, 135, 138, 106; 452/30, 35; 138/118.1

[56] References Cited

U.S. PATENT DOCUMENTS

| | | | |
|---|---|---|---|
| 3,329,509 | 7/1967 | Julius | 523/100 |
| 3,494,772 | 2/1970 | Bradshaw et al. | 426/277 |
| 3,494,773 | 2/1970 | Courts | 426/140 |
| 3,497,584 | 2/1970 | Bridgeford et al. | 264/137 |
| 4,592,795 | 6/1986 | Bridgeford | 156/203 |
| 5,047,253 | 9/1991 | Juhl et al. | 426/113 |
| 5,089,307 | 2/1992 | Ninomiya et al. | 428/35.2 |
| 5,095,054 | 3/1992 | Lay et al. | 524/47 |
| 5,362,777 | 11/1994 | TOmka | 524/47 |
| 5,439,953 | 8/1995 | Ritter et al. | 524/47 |
| 5,506,046 | 4/1996 | Andersen et al. | 428/34.5 |

FOREIGN PATENT DOCUMENTS

| | | |
|---|---|---|
| 3868089 | 3/1990 | Australia . |
| 0 400 484 | 12/1990 | European Pat. Off. . |
| 0 471 306 | 2/1992 | European Pat. Off. . |
| 1333576 | 9/1962 | France . |
| 1436576 | 11/1964 | France . |
| 1260250 | 4/1970 | France . |
| 1 544 155 | 4/1979 | United Kingdom . |
| 90/01878 | 3/1990 | WIPO . |
| 90/05161 | 5/1990 | WIPO . |
| 90/10019 | 9/1990 | WIPO . |

OTHER PUBLICATIONS

Database WPI, Section Ch, Week 7730, Derwent Publications Ltd., AN 77–52921Y & JP–A–52 070 039, Sumitomo Bakelite KK, (Jun. 10, 1977).

Chemical Abstract of Japan, vol. 81, No. 23, Dec. 9, 1974, "Protein Film for Sausage Casing", Abstract No. JP 74 059 158, (Jun. 8, 1974).

*Primary Examiner*—Rena L. Dye
*Attorney, Agent, or Firm*—Foley & Lardner

[57] ABSTRACT

Sausage casings of starch which can be processed like a thermoplastic and to processes for the production and use thereof. The sausage casing comprises a thermoplastic starch which is comprised of natural starch which has been converted into an amorphous state.

18 Claims, No Drawings

SAUSAGE CASINGS MADE OF THERMOPLASTIC STARCH AND PROCESS FOR THE PRODUCTION THEREOF

BACKGROUND OF THE INVENTION

1. Field of the Invention

The present invention relates to sausage casings and to processes for the production and use thereof.

2. Description of Related Art

In sausage production, virtually only the collagen casings, also known as membrane fibrous casings, the cellulose hydrate casings and casings made of synthetic polymers have achieved importance. The latter generally comprise polyamide, polyethylene, polypropylene, poly(ethylene terephthalate), poly(butylene terephthalate) or poly (vinylidene chloride) copolymers. Other synthetic casings, such as casings made of protein- or acrylate-coated fabric have achieved only minimal importance.

Collagen casings and cellulose hydrate casings have the advantage that they are produced from renewable raw materials, are biodegradable and thus can be composted. The processes for their production, however, are generally highly complex and environmentally polluting. Thus, for example, synthetic casings based on cellulose hydrate are produced by the viscose process, in which sodium hydroxide solution and carbon disulfide are used.

The casings produced from synthetic polymers can be produced simply and inexpensively by extrusion, but they are not biodegradable and must therefore be disposed of in a complex manner.

SUMMARY OF THE INVENTION

It is therefore an object of the present invention to provide a sausage casing which has the advantages of the known casings. It is a further object to provide a sausage casing which is capable of being used with all sausage types. It is another object to provide an edible sausage casing. It is a still further object to provide a sausage casing which is easily manufactured and producible in an environmentally friendly manner. It is yet a further object to provide a sausage casing which is produced from renewable raw materials and which is biodegradable. It is also an object to provide a method for producing and using such casings.

These objects and others have been achieved by providing a casing comprising a thermoplastic starch. There is also provided a process for the production of sausage casings comprising a thermoplastic starch, which comprises forming the themoplastic resin by heating dry starch with an additive. The additives are in general polar compounds which are capable of forming hydrogen bonds with the starch and thus induce the starch to give up its α-helix structure. Accordingly, additives comprising OH groups and NH groups are particularly suitable. Solid additives, such as N,N-dimethyl urea, are employed together with a solvent (usually water). Preferred additives are selected from water, glycerol, ethylene glycol and propylene glycol. The thermoplastic starch is then molded using an extruder to form a tubular casing. The casing is inflated and stretched in a ratio from 1:2 to 1:10, based on the surface area of the prestreched casing compared with the surface area of the casing after stretching.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

DETAILED DESCRIPTION OF PREFERRED EMBODIMENTS

The present invention comprises a sausage casing of starch which can be processed like a thermoplastic and an extrusion process for the production thereof. The sausage casing comprises a thermoplastic starch which is comprised of natural starch which has been converted into an amorphous state, that is, a natural starch which has been melted below its decomposition temperature to break down the α-helix structure of the starch.

The casings according to the present invention may be prepared by combining thermoplastic starch, a fiber reinforcement, a protein, and a crosslinker to form a mixture. The mixture is then molded using an extruder to produce a tubular casing. The tubular casing is inflated and stretched in a ratio of from 1:2 to 1:10, based on the surface area of the prestreched casing compared with the surface area of the casing after stretching.

Natural starch, such as potato starch, corn starch or cereal starch, is composed of macromolecules and is highly inhomogeneous. The macromolecules occur in the form of α-helix. On heating, the natural starch decomposes before it reaches the melting temperature. The thermoplastic starch may be formed by converting the natural starch in any manner which gives a starch having thermoplastic properties. If water is added to natural starch in advance of heating, a composition which can be processed like a thermoplastic is obtained. Water, because of its low boiling point, is not so expedient in this type of process. Thus, additives such as glycerol, ethylene glycol or propylene glycol may be employed which are more suitable than water, since they have a higher boiling point. The proportion of these additives should most preferably be at least 5% by weight, based on the weight of the dry starch.

Any desired thermoplastic starch may be used in the present invention. Thermoplastic starch, process for the production thereof and shaped bodies produced therefrom are disclosed by WO 90/05161 and 90/10019, the disclosures of which are incorporated herein by reference. These WO applications specify that thermoplastic starch may be suitable as a filler or formulation aid in thermoplastics and thermosets, as a carrier material for active compounds, such as pharmaceutically active compounds, or as reagents such as flocculents for waste water. In addition, extruded films of thermoplastic starch can be laid out in a low-water environment or on a water-permeable underlay and bind water so as to improve the efficiency of soil irrigation in arid regions. However, there has been no previous indication in WO 90/05161, 90/10019, or elsewhere that thermoplastic starch could be suitable for the production of sausage casings, especially those which cover a broad field of application.

The starting material used for the production of the sausage casings of the present invention is thermoplastic starch which is disclosed, for example, in the WO publications. This starch generally occurs as granules or in the form of beads. It is important for the production of sausage casings having optimal properties that the natural starch is converted into an amorphous state with abolition of the α-helix structure. This conversion is successfully achieved, for example, by heating and mechanical mixing, expediently in a kneader or in a single- or twin-screw extruder. In order to achieve melting of the starch below the decomposition temperature, the known plasticizers such as water, ethylene glycol, butane-1,2-diol (=propylene glycol), butane-1,3-diol, glycerol, diglycerol, N,N-dimethylurea, sorbitol or citrate may be used. Alternately, any method may be employed which successfully breaks down the α-helix structure of the starch and converts the same into an amorphous state.

When water is used as plasticizer, it is preferably used in an amount of about 15 to 25% by weight, and most preferably about 17% by weight, based in each case on the weight of the thermoplastic starch (natural starch+plasticizer). The temperature may range from about 100 to 130° C. When glycerol is used as plasticizer, an amount of 0.5 to 20% by weight, preferably 8 to 16% by weight, is sufficient, again based on the weight of the thermoplastic starch in each case. The temperature employed when using glycerol is preferably somewhat higher, for example, 150 to 170° C. is favorable. The crystalline proportion in the thermoplastic starch should most preferably be less than 5% by weight.

In order to adapt the casings to the various sausage types, suitable substances may also be added to the granulated thermoplastic starch. In particular, fibers which increase the mechanical strength may be added. Such sausage casings which include fibers are novel and are therefore within the scope of the present invention. Any desired fiber reinforcement may be employed.

Casings for raw sausage, in addition to the thermoplastic starch, in a preferred embodiment contain 5 to 30% by weight, preferably 10 to 20% by weight, fiber reinforcement, preferably cotton combings, 3 to 25% by weight, preferably 5 to 15% by weight, protein, preferably gelatin, casein, wheat protein or mixtures thereof, and 2 to 15% by weight, preferably 3 to 10% by weight, crosslinker, preferably a dicarboxylic acid, a dialdehyde, a diisocyanate, a diepoxide, or mixtures thereof.

All percentages are expressed as % by weight with respect to the weight of the plasticized starch (total weight of starch+plasticizer).

In order to satisfy the requirements for scalded-meat sausage and cooked-meat sausage and cooked ham, fiber reinforcement is preferably included. Cotton linters, synthetic fibers or regenerated fibers, that is, fibers from regenerated cellulose, are particularly suitable therefor. The proportion of fiber reinforcement included in the casing, if added, is generally 3 to 25% by weight, preferably 5 to 15% by weight.

A further quality improvement—depending on the application—may be achieved by the addition of synthetic polymers, preferably soft and ductile polyamides, polyesters, polyolefins, ethylene/ethylacrylate/maleic anhydride copolymers or polyvinylpyrrolidone (PVP). The polyolefins are preferably low-density polyethylenes or polypropylenes. The proportion of the synthetic polymers is expediently 5 to 50% by weight, preferably 10 to 40% by weight based on the weight of the thermoplastic starch. Crosslinkers may also be added to increase the water resistance of the casing. The crosslinkers are typically added to the casings for scalded-meat sausage and cooked ham, in a proportion from 2 to 20% by weight, preferably 3 to 12% by weight. The crosslinker employed may include any desired, for example, dicarboxylic acid, dialdehydes, diisocyanates and diepoxides.

Lubricants may be added to facilitate extrusion. For this purpose, one or more animal or vegetable fats or lecithins or any lubricant disclosed in the abovementioned WO 90/05161 are especially suitable. However, any lubricant which would act to facilitate extrusion and/or improve the peelability and likewise the water resistance of the resultant casing may be employed. The proportion of lubricant, if added, is generally 2 to 12% by weight, preferably 3 to 6% by weight.

When fiber reinforcements are not included in the casing, the fiber-free, transparent casings may contain further additives in order to appropriately adjust the mechanical properties of the casings, such as flexibility, tensile strength and boiling water resistance. Preferred additives of this type include alginate, chitosan, extrudable cellulose derivatives (preferably cellulose acetate or cellulose propionate) and/or any proteins (preferably gelatin) in addition to the thermoplastic starch. The proportion of additional constituents may range from 5 to 70% by weight, preferably 20 to 50% by weight. To improve the mechanical stability and the water resistance and resistance to boiling, the abovementioned crosslinkers can additionally be present in fiber-free casings in a proportion of from 2 to 15% by weight, preferably 5 to 10% by weight. The suppleness of the sausage casing when it is stretched can be further improved by the optional addition of a softener, preferably glycerol or citric ester. The proportion of the added softener is typically 3 to 30% by weight, and preferably 5 to 20% by weight.

A process for the production of starch-based sausage casings is likewise provided by the present invention. Although any desired process is possible, a preferred process comprises molding the mixture of thermoplastic starch and the remaining constituents using an extruder, preferably a single- or twin-screw extruder having a ring die attached thereto, which is heated to generally 100 to 140° C., preferably 105 to 120° C. The thermoplastic starch and remaining additives form a homogeneous melt in the extruder and then the melt is extruded to give a tubular casing. The casing is then inflated and stretched in a ratio of 1:2 to 1:10, preferably 1:3 to 1:5, based on the surface area of the prestretched casing compared with the surface area of the casing after stretching. Stretching is preferably accomplished by blow molding, and the casing is preferably inflated using air.

In a further step, an impregnation or coating can subsequently be applied internally and/or externally. The impregnation and/or coating serves in particular to improve the sausage emulsion adhesion or to increase resistance to mold.

The starch-based sausage casings of the present invention exhibit all of the positive properties of cellulose hydrate casings. The impregnations or coatings known from the cellulose hydrate casings are generally also suitable for the starch casings. In particular, layers can also be applied which act as a barrier for oxygen and/or water vapour. The starch casings can be adapted by this means to all important sausage types.

The invention is illustrated by the following examples. The examples are for illustrative purposes and do not limit the invention.

EXAMPLES

Production of the thermoplastic starch 100 kg of potato starch were dried in vacuo until the water content was less than 0.3% by weight. The starch was then mixed with 50 kg of glycerol (99% by weight pure) in a kneader at a temperature of 160 to 190° C. To abolish the helix structure, the melt produced in this process was kept for about 2 hours at a temperature of 170° C. It was then extruded and granulated. Even after relatively long storage, the starch remained virtually completely amorphous in the granules.

EXAMPLE 1

To produce a raw sausage casing having fiber reinforcement,
75.0 kg of the abovedescribed granules (50 kg of starch+25 kg of glycerol) were mixed with
10.0 kg of cotton linters,
10.0 kg of gelatin,
2.5 kg of adipic acid and
2.5 kg of sunflower seed oil,
extruded at 110 to 120° C. and stretched longitudinally and transversely in the ratio of 1:8, based on the surface area. In this manner, a tube of caliber 60 (=60 mm) was obtained, having a wall thickness of 90 µm.

The tube was then laid flat, wound up and then gathered together to form concertinaed casings or finished to form sections tied off at one end.

In order to test the mechanical properties of the casing, it was soaked in water and subjected to a pressure test. It did not burst until a pressure of 65 to 72 kPa (bursting pressure) was reached. The static extension at 21 kPa was 65 to 75 mm.

In order to test the applicability, the casings were filled with salami emulsion and subjected to the usual ripening process. During ripening, the casing did not detach from the emulsion, i.e. "disconnection" of the casing did not occur. The peelability of the ripened salami was evaluated as "2" (rating scale of 1 to 6; 1=very good peelability, 6=no longer peelable).

EXAMPLE 2

To produce a casing for scalded-meat and cooked-meat sausage and cooked ham,
75.0 kg of the abovedescribed granules were mixed with
7.5 kg of cotton linters,
20.0 kg of a soft, supple copolyamide,
5.0 kg of glyoxal and
7.5 kg of lecithin.

The mixture was homogenized by kneading for about half an hour at 185° C. and was then extruded through a ring die for caliber 60. By blow-molding, the tubular casing was then stretched longitudinally and transversely in the ratio of 1:6 (based on the surface area). The wall thickness of the stretched tube was 85 µm. The bursting pressure of the water-soaked casings was 72 kPa, the static extension at 21 kPa was 68 mm.

A water-soaked casing piece tied off at one end was then filled with meat sausage emulsion. The casing could be removed without difficulty from the conventionally scalded and smoked sausage.

EXAMPLE 3

To produce a fiber-free, transparent sausage casing,
75.0 kg of the abovedescribed granules were mixed with
20.0 kg of gelatin,
10.0 kg of chitosan
7.5 kg of glyoxal,
5.0 kg of triethyl acetylcitrate (®Citroflex A4) and
2.5 kg of lecithin,
processed in an extruder at 178° C. to give a homogeneous melt and extruded through a ring die for caliber 75. The tubular casing was then stretched longitudinally and transversely by blow-molding in the ratio of 1:8 (based on the surface area), then laid flat and wound up. The wall thickness of the stretched casing was 108 µm. The bursting pressure of the water-soaked casing was 30 kPa. The static extension at 15 kPa was 88 to 92 mm.

Sections of the tubular casing tied off at one end were filled with "Bierwurst" emulsion. After scalding and smoking, the casing could be peeled off easily from the emulsion.

EXAMPLE 4

A fiber-free casing could also be produced with starch which had been plasticized with water instead of glycerol. For this purpose,
100.0 kg of potato starch were mixed with
7.0 kg of water,
1.0 kg of sunflower seed oil and
0.5 kg of lecithin.

The mixture was melted in a kneader at 165° C. and homogenized for 1 hour. The melt was then extruded and granulated.
60.0 kg of the granules thus produced were then mixed with
10.0 kg of gelatin,
10.0 kg of chitosan,
10.0 kg of glycerol,
7.5 kg of glyoxal and
5.0 kg of sunflower seed oil.

The mixture was converted into a homogeneous melt using an extruder and was extruded through a ring die for caliber 80. By blow-molding in the ratio 1:6 (based on the surface area), the tubular casing was then stretched longitudinally and transversely. The casing was then laid flat and rolled up. The wall thickness of the stretched casing was 95 µm. The bursting pressure of the water-soaked casing was 22 kPa. The static extension at 15 kPa was 95 to 100 mm.

Casing part-pieces tied off at one end were filled with long-keeping-sausage emulsion. The sausages ripened without defect and could be easily peeled.

Additional advantages and modifications will readily occur to those skilled in the art. Therefore, the invention in its broader aspects is not limited to the specific details, and representative embodiments, shown and described in the description and examples. Accordingly, various modifications may be made without departing from the spirit or scope of the general inventive concept as defined by the appended claims and their equivalents.

What is claimed is:

1. A tubular sausage casing comprising a thermoplastic starch, wherein the casing is stretched in an area stretch ratio of from 1:2 to 1:10.

2. A casing of claim 1, wherein the thermoplastic starch is formed by heating dry starch with an additive.

3. A casing according to claim 1, further comprising:
   5 to 30% by weight fiber reinforcement based on the weight of the thermoplastic starch;
   3 to 25% by weight protein based on the weight of the thermoplastic starch; and
   2 to 15% by weight crosslinker based on the weight of the thermoplastic starch.

4. A casing according to claim 1 which is suitable for scalded meat sausage and cooked ham comprising 3–25% by weight of a fiber reinforcement based on the weight of the thermoplastic starch.

5. A casing as claimed in claim 4, further comprising at least one component selected from the group consisting of a synthetic polymer, a crosslinker and a lubricant.

6. A casing as claimed in claim 5, wherein the proportion of the synthetic polymer is 5 to 50% by weight based on the weight of the thermoplastic starch, the proportion of the crosslinker is 2 to 20% by weight based on the weight of the thermoplastic starch, and the proportion of the lubricants is 2 to 12% by weight based on the weight of the thermoplastic starch.

7. A casing of claim 1, which is fiber-free, transparent and comprises
a component selected from alginate, chitosan, extrudable cellulose derivatives and proteins, said component being present in a proportion from 5 to 70% by weight of the thermoplastic starch.

8. A casing as claimed in claim 7, wherein the casing contains at least one crosslinker in a proportion of from 2 to 15% by weight, or softeners in a proportion of from 3 to 30% by weight.

9. A casing as claimed in claim 6, wherein the proportion of the synthetic polymers is from 10 to 40% by weight with respect to the weight of the thermoplastic starch, the proportion of crosslinker is 3 to 12% by weight with respect to the weight of the thermoplastic starch and the proportion of lubricants is from 3 to 6% by weight with respect to the weight of the thermoplastic starch.

10. A casing as claimed in claim 8, wherein the casing contains at least one crosslinker in a proportion of from 5 to 10% by weight with respect to the weight of the thermoplastic starch or softener in a proportion of from 5 to 20% by weight with respect to the weight of the thermoplastic starch.

11. A casing as claimed in claim 3, wherein the fiber reinforcement comprises cotton combings.

12. A casing as claimed in claim 3, wherein the protein is selected from gelatin, casein, wheat protein, and mixtures thereof.

13. A casing as claimed in claim 3, wherein the crosslinker is selected from a dicarboxylic acid, a dialdehyde, a diisocyanate, a diepoxide, and mixtures thereof.

14. A casing as claimed in claim 5, wherein the synthetic polymer is selected from the group consisting of polyamides, polyesters, polyolefins, ethylene/ethylacrylate/maleic anhydride copolymers and polyvinylpyrrolidone (PVP).

15. A casing as claimed in claim 14, wherein the polyolefins comprise low-density polyethylenes or polypropylenes.

16. A sausage product comprising a casing as defined according to claim 1 containing therein a sausage filling product.

17. A method for preparing a filled sausage casing comprising filling a tubular casing comprising a thermoplastic starch with sausage.

18. A filled sausage casing prepared by a method as claimed in claim 17.

* * * * *